US012279604B2

(12) United States Patent
Cook

(10) Patent No.: US 12,279,604 B2
(45) Date of Patent: Apr. 22, 2025

(54) DEVICE FOR CONNECTING A LURE TO FISHING LINE

(71) Applicant: Todd Michael Cook, Painted Post, NY (US)

(72) Inventor: Todd Michael Cook, Painted Post, NY (US)

( * ) Notice: Subject to any disclaimer, the term of this patent is extended or adjusted under 35 U.S.C. 154(b) by 756 days.

(21) Appl. No.: 16/269,697

(22) Filed: Feb. 7, 2019

(65) Prior Publication Data

US 2019/0246613 A1 Aug. 15, 2019

Related U.S. Application Data

(60) Provisional application No. 62/628,343, filed on Feb. 9, 2018.

(51) Int. Cl.
*A01K 91/04* (2006.01)

(52) U.S. Cl.
CPC .................... *A01K 91/04* (2013.01)

(58) Field of Classification Search
CPC ...... A01K 91/03; A01K 91/04; A01K 91/047; A44B 13/0011
See application file for complete search history.

(56) References Cited

U.S. PATENT DOCUMENTS

| 50,720 | A | * | 10/1865 | Knowlton | ............... | A01K 91/04 24/601.3 |
| 408,813 | A | * | 8/1889 | Riley | ..................... | A01K 91/04 24/601.8 |
| 472,962 | A | | 4/1892 | Collins | | |
| 745,131 | A | | 11/1903 | Abbath | | |
| 843,748 | A | * | 2/1907 | Harris | ..................... | A01K 91/04 43/44.85 |
| 847,271 | A | * | 3/1907 | Atkinson | ............... | A01K 91/04 24/601.8 |
| 922,473 | A | * | 5/1909 | Gronke | ................... | A01K 91/04 24/601.3 |
| 1,728,560 | A | | 9/1929 | Goshorn | | |
| 1,867,555 | A | * | 7/1932 | Hildebrandt | ........... | A01K 85/10 43/42.11 |
| 1,998,035 | A | | 4/1935 | Wiberg | | |

(Continued)

FOREIGN PATENT DOCUMENTS

JP 2006333797 A * 12/2006

OTHER PUBLICATIONS

Sports Professionals. "Split Snap". http://www.spro.com/ProductDetails.asp?ProductCode=SSPSB%2DALL.

(Continued)

*Primary Examiner* — Morgan T Jordan
*Assistant Examiner* — Kari A Bradberry
(74) *Attorney, Agent, or Firm* — Thomas G. Ference

(57) ABSTRACT

A device for connecting a lure to a fishing line, the device includes a main shaft having a line attachment end and a lure holding end. A line holding element is provided at the line attachment end and a lure holding loop is provided at the lure holding end. The device further includes various other components to improve lure retention without impairing lure movement. These other components include one or more from the group of a retaining loop, three or more resistance points, a zigzag structure and a reverse direction terminating segment.

27 Claims, 6 Drawing Sheets

(56) References Cited

U.S. PATENT DOCUMENTS

| | | | |
|---|---|---|---|
| 2,050,757 A * | 8/1936 | Leon | A01K 91/04 24/601.3 |
| 2,109,967 A | 3/1938 | Brotsker et al. | |
| 2,219,983 A | 10/1940 | Evenson | |
| 2,240,235 A | 4/1941 | Whan | |
| 2,315,295 A | 3/1943 | Stogermayr | |
| 2,371,295 A | 3/1945 | Hopkins | |
| 2,601,709 A * | 7/1952 | Reichardt | A01K 91/04 24/373 |
| 2,720,014 A | 10/1955 | Caldwell | |
| 2,732,652 A * | 1/1956 | Parks | A01K 91/14 43/44.83 |
| 3,122,803 A | 3/1964 | Boggess et al. | |
| 3,277,549 A | 10/1966 | Bradshaw | |
| 3,335,472 A | 8/1967 | Imai | |
| 3,750,240 A | 8/1973 | Fridrich | |
| 3,936,971 A * | 2/1976 | McGahee | A01K 91/04 43/44.83 |
| 4,004,328 A | 1/1977 | Bohn | |
| 4,100,658 A | 7/1978 | Nikota | |
| 4,234,998 A | 11/1980 | McMickle et al. | |
| 4,656,699 A | 4/1987 | Maahs | |
| 4,696,120 A | 9/1987 | Schroeder | |
| 4,819,305 A * | 4/1989 | Ooe | A01K 91/03 24/131 C |
| D308,240 S | 5/1990 | Buchanan | |
| 5,042,191 A | 8/1991 | Fett | |
| 5,076,006 A | 12/1991 | Kahng | |
| 5,181,337 A | 1/1993 | DuBois | |
| 5,603,181 A * | 2/1997 | Abdul-Raheem | A01K 91/04 24/131 R |
| 5,655,329 A | 8/1997 | Yong-Set | |
| D393,688 S | 4/1998 | Essad | |
| 5,781,972 A | 7/1998 | Steed | |
| D430,261 S | 8/2000 | Yong-Set | |
| D536,763 S | 2/2007 | Friedrichs | |
| D760,342 S | 6/2016 | Kim | |
| D760,343 S | 6/2016 | Kim | |
| D816,184 S | 4/2018 | Kim | |
| D816,185 S | 4/2018 | Kim | |
| D834,139 S | 11/2018 | Kim | |
| D834,140 S | 11/2018 | Kim | |
| 2006/0265939 A1 | 11/2006 | Friedrichs | |
| 2014/0196355 A1 * | 7/2014 | Colucci | A01K 91/06 43/43.1 |

OTHER PUBLICATIONS

Stringease. "Stay-Lok Snaps". https://stringease.com/collections/snaps/products/stay-lok-snaps.

Stringease. "Fastach Clips". https://stringease.com/collections/snaps/products/fastach-clips. 2 pages.

Malm Fishing Services. "Malm's Custom Hand-Made Spin-Snaps". http:/web.archive.org/web/20130131083820/http://malmfishingservices.com/products-page/swivels-snaps/malms-custom-hand-made-spin-snaps-2/.

SkruvBeteslas. Published Nov. 25, 2014. https://www.youtube.com/watch?v=D53di5HnH50&list=UUbov7PCRKWmbkUrCM-rqnJQ.

* cited by examiner

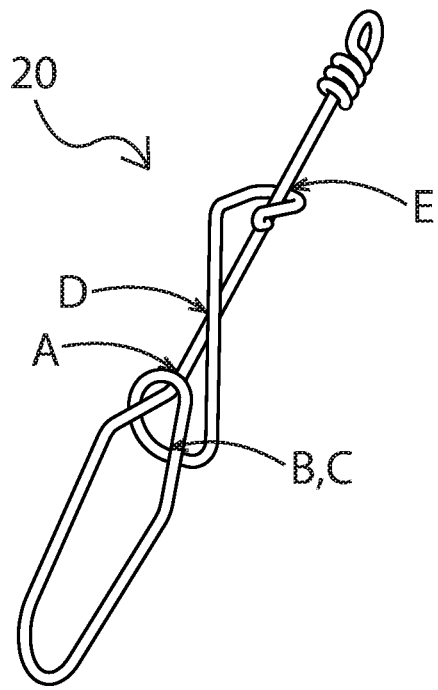
Figure 3i
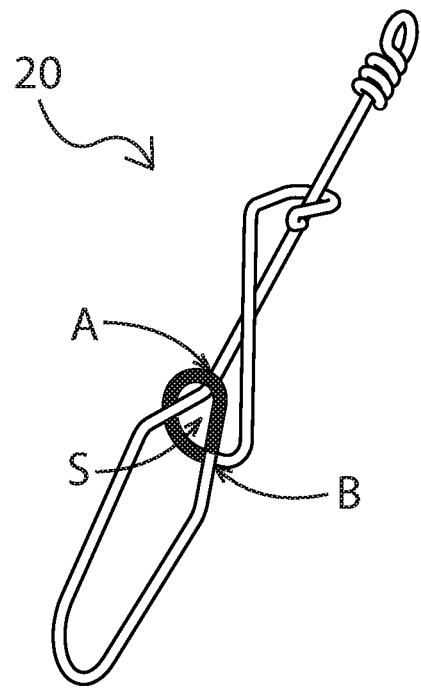
Figure 3j
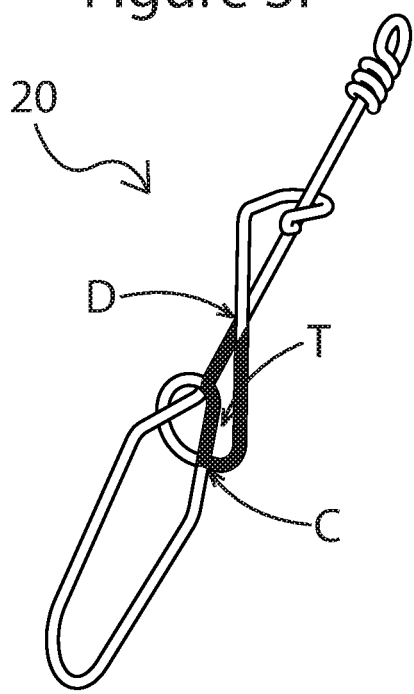
Figure 3k
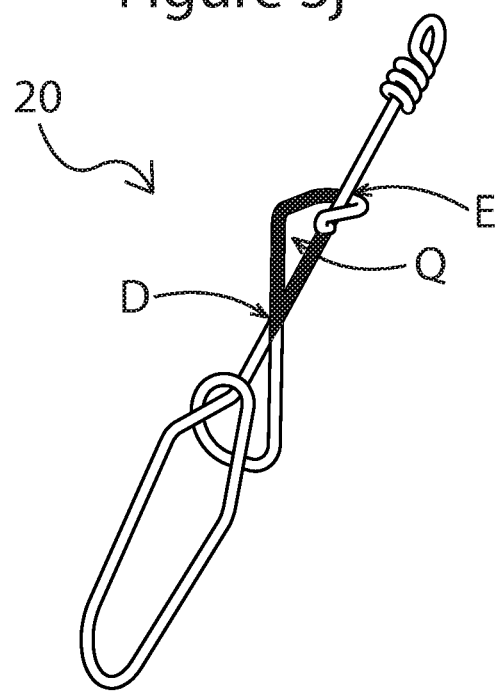
Figure 3ℓ

DEVICE FOR CONNECTING A LURE TO FISHING LINE

RELATED APPLICATIONS

This application claims the benefit of priority of U.S. Provisional Patent Application No. 62/628,343, filed on Feb. 9, 2018, the disclosure of which is herein incorporated by reference. This patent application is also related to U.S. Design patent application Ser. No. 29/636,568, filed on Feb. 9, 2018, and entitled "Device for Connecting a Lure to Fishing Line", the disclosure of which is incorporated herein by reference.

FIELD

The present invention generally relates to a device for connecting fishing line to a lure. More specifically, the invention relates to a device with multiple resistance points that prevent the lure from disconnecting and if the lure does pass one or more of the resistance points the lure can still move freely with a natural lure action.

BACKGROUND

Numerous devices exist for attaching a lure to a fishing line. These devices try to provide for a strong connection, ease of attachment, unhindered natural lure movement and minimizing the possibility of detachment of the lure. Two main classes of lure attachment devices exist; open and closing fishing snaps (U.S. Pat. Nos. 2,109,967, 5,781,972, 4,234,998, 5,042,191 and D430,261) and wind-on fishing devices (US 2006/0265939 and U.S. D536,763). While the goal of these devices is to maximize all of the attributes listed above usually only one or two of the attributes are achieved for any device.

For example, snaps that open and close have several drawbacks. These devices tend to weaken over time and have a propensity to unexpectedly open. Open and closing snaps usually have a single point of resistance along the main bracing arm, where if this point of resistance fails (i.e., it opens), then the lure or fish may be lost. Open and closing snaps can be hard on the fingers, especially in cold weather. Small versions can be tedious and dexterously challenging. Cross-locking mechanisms can be especially dexterously challenging because the larger latching hook or bent hook extremity can often end up accidentally closing on the inside of the smaller latching hook or bent hook extremity. This can be very difficult to reopen. Cross-locking mechanisms lack closed wire twists at their endpoint and as a result are weaker where the fishing line attaches. Cross-locking mechanisms also do not lend themselves to an extended leader or single wire with a snap built-in because of the necessity to interlock the two ends of the snap; this therefore requires a separate component for leader implementation. Open and closing fishing snaps with two half loops, such as U.S. Pat. No. 5,042,191, offer a single point of tension that exists at the bottom of the half loops. Lures can work their way through these two half loops without any visual indication of a problem. These same snaps with their two overlapped half loops also often negatively affect fishing lure action because the overlapping portions double the necessary space (two overlapping pieces of wire vs. a single piece of wire) needed for the snap to move freely against the lure eyelet.

Similarly, wind-on devices also have several drawbacks. Wind-on fishing snaps possess a design whereby a permanent latching hook or bent hook extremity large enough to wind on a lure suffers from an opening gap forming over time as the metal loses its strength and springiness which keeps the gap closes. Some wind-on devices have multiple coils running parallel to one another around a central body portion (U.S. Pat. No. D536,763). In larger sizes, the coils tend to be far enough apart such that they provide an easy pathway for a lure to start working its way back out which affects the lure action. In smaller sizes, the multiple coils are all but destroyed when trying to wind on lures of even moderate size.

The present invention aims to eliminate many of the short comings of prior devices and provide the desired combination of a strong connection, ease of attachment, multiple resistance points, natural lure action and accommodate an extended leader.

SUMMARY

In one implementation, the present disclosure is directed to a device for connecting a lure to a fishing line. The device comprises a main shaft having a line attachment end and a lure holding end. A line holding element is provided at the line attachment end. A lure holding loop is provided at the lure holding end. The device further comprises a retaining loop continuing from the lure holding loop and substantially perpendicular to the main shaft. The retaining loop generates two points of resistance (three resistance points when considering that one is used twice) and the perpendicular orientation to the main shaft inhibits movement along the main shaft.

In another implementation, the present disclosure is directed to a device for connecting a lure to a fishing line. The device comprises a main shaft having a line attachment end and a lure holding end. A line holding element is provided at the line attachment end. A lure holding loop is provided at the lure holding end, the lure holding loop having a lure holding loop extension that extends towards the line attachment end, the lure holding loop extension creating three or more resistance points for the lure to inhibit the lure from disengaging from the device.

In yet another implementation, the present disclosure is directed to a device for connecting a lure to a fishing line. The device comprises a main shaft having a line attachment end and a lure holding end. A line holding element is provided at the line attachment end. A lure holding loop is provided at the lure holding end, the lure holding loop extends towards the line attachment end to form a zigzag structure that provides retaining areas for the lure.

In still yet another implementation, the present disclosure is directed to a device for connecting a lure to a fishing line. The device comprises a main shaft having a line attachment end and a lure holding end. A line holding element is provided at the line attachment end. A lure holding loop is provided at the lure holding end. The device further comprises an arced section crossing the main shaft. The arced section bends away from the line holding end. The arced section has a curved region connecting a terminating segment and a zag segment. The terminating segment is longer than the zag segment to prevent manual unraveling of the device.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 3i is a perspective view of the device in FIG. 1 with the resistance points highlighted;

FIG. 3j is a perspective view of the device in FIG. 1 indicating a secondary retaining region;

FIG. 3k is a perspective view of the device in FIG. 1 indicating a tertiary retaining region;

FIG. 3l is a perspective view of the device in FIG. 1 indicating a quaternary retaining region.

DETAILED DESCRIPTION

Figure 1:
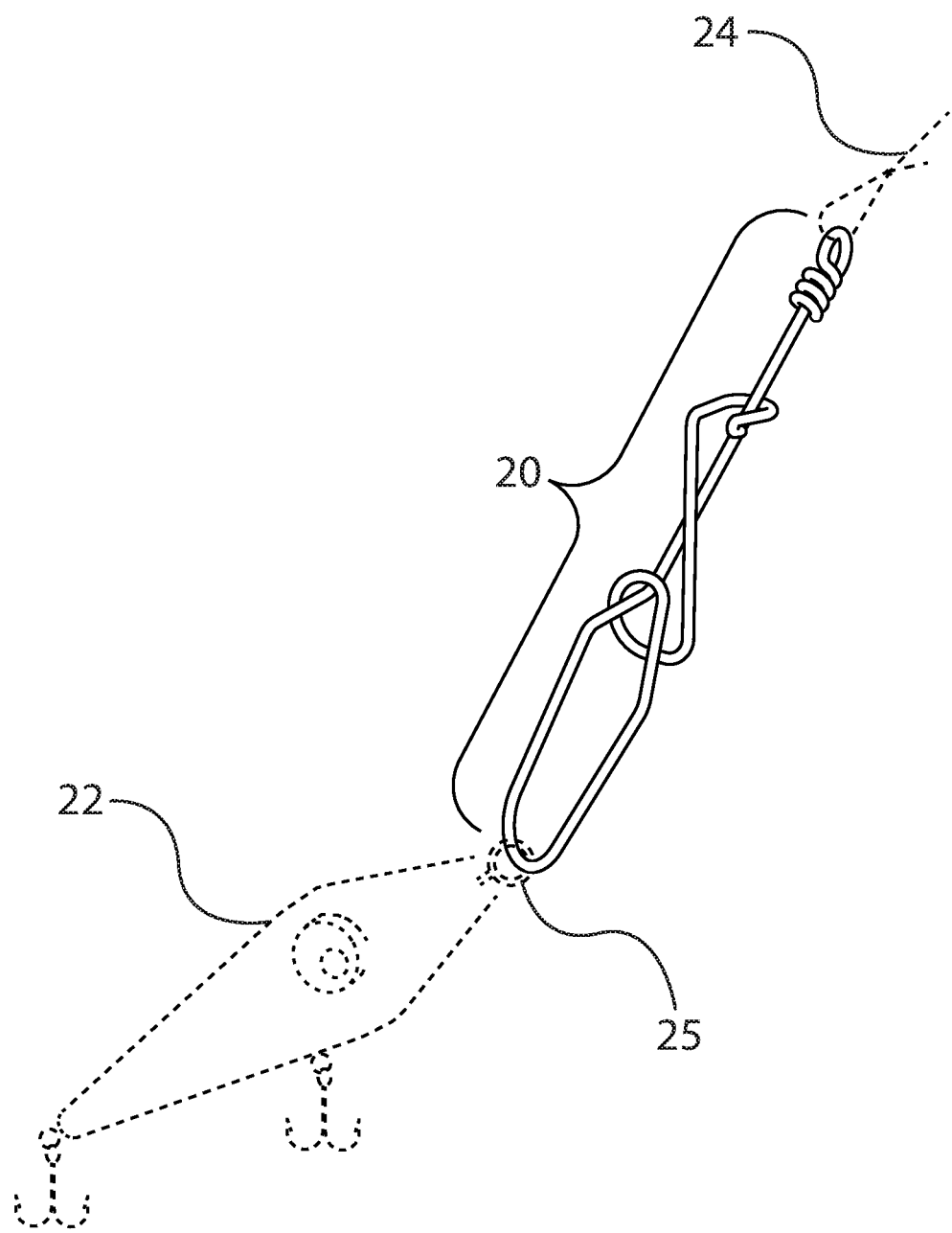
FIG. 1 is a perspective view of one exemplary embodiment of the device for connecting a lure to a fishing line.
Figure 2A:
FIG. 2a is left-side elevational view of the device in FIG. 2b.
Figure 2B:
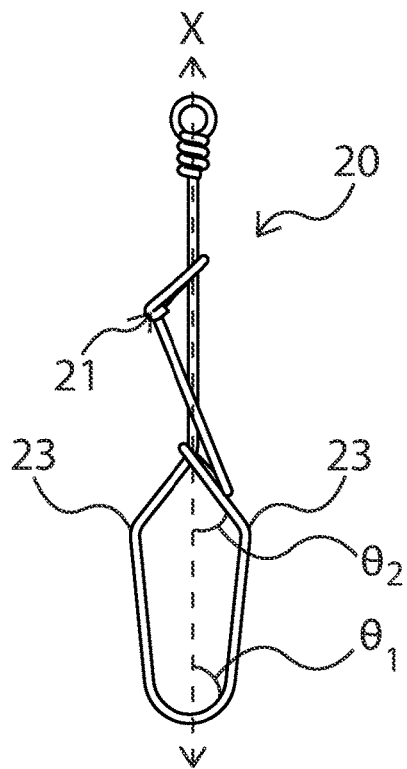
FIG. 2b is a front elevational view of the device in FIG. 1.
Figure 2C:
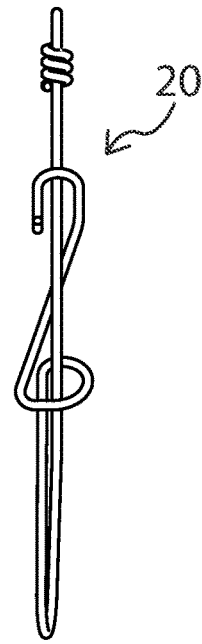
FIG. 2c is a right-side elevational view of the device in FIG. 2b.
Figure 2D:
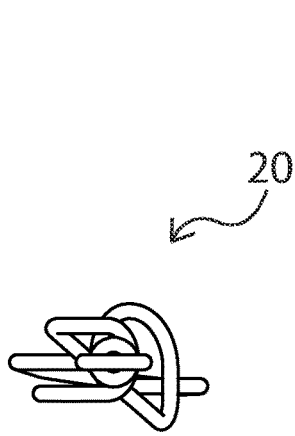
FIG. 2d is a top plan view of the device in FIG. 2b.
Figure 2E:
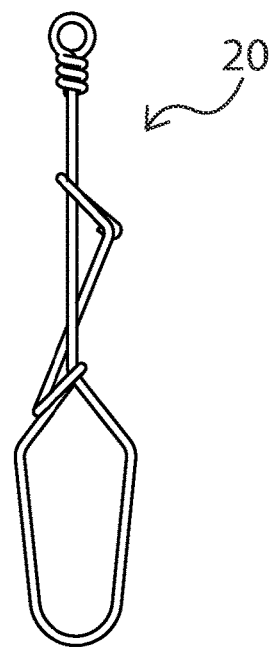
FIG. 2e is a back elevational view of the device in FIG. 2b.
Figure 2F:
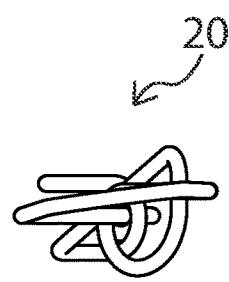
FIG. 2f is a bottom plan view of the device in FIG. 2b.

Device 20 (a.k.a. Prevent Snap™) for connecting lure 22 to fishing line 24 is illustrated in FIGS. 1-4. Lure 22 has a lure attachment element 25 that may be a front eyelet, split ring or other element allowing attachment of the lure. Various views of device 20 are shown in FIGS. 2a-2b. Device 20 is made of wire having a wire thickness. Device 20 comprises a main shaft 26, FIG. 3a. Main shaft 26 has a line attachment end 28 and a lure holding end 30. Main shaft 26 provides the main structural strength for device 20. Main shaft 26 defines a central axis for device 20, device axis X.

Figures 3A, 3B:
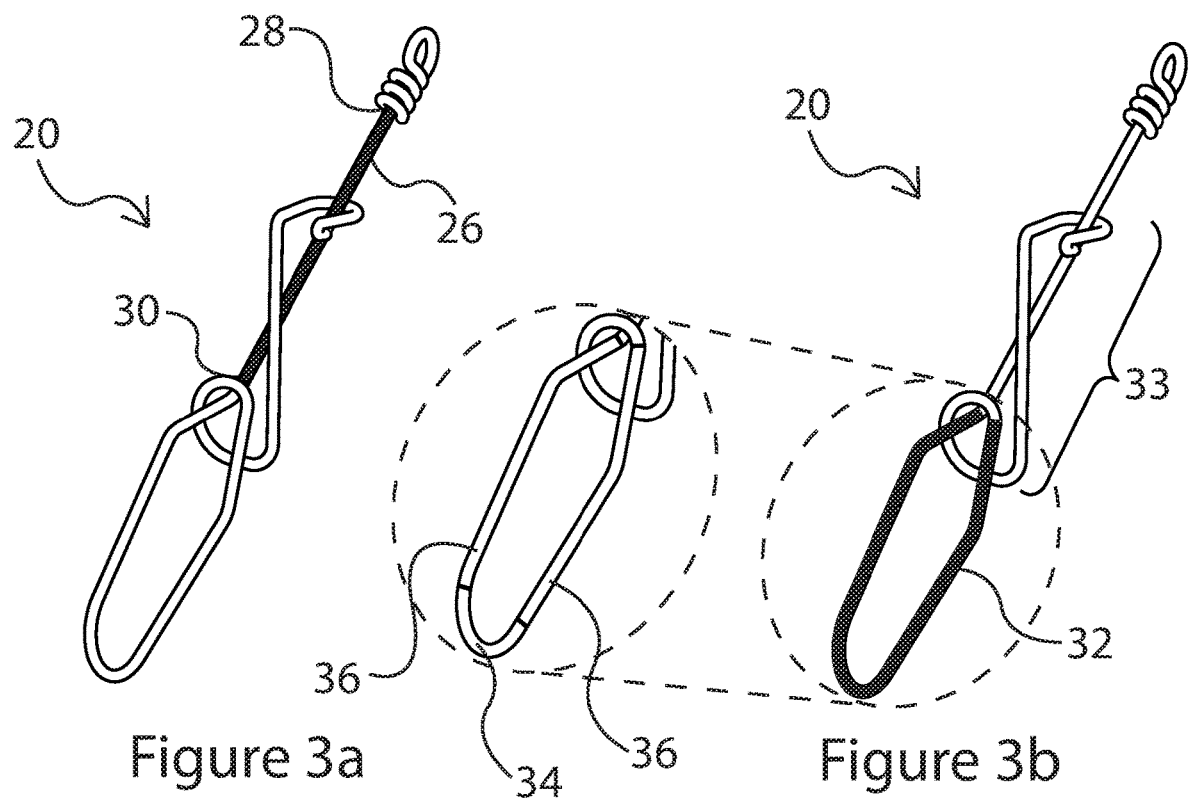
FIG. 3a is a perspective view of the device in FIG. 1 with the main shaft highlighted.
FIG. 3b is a perspective view of the device in FIG. 1 with various parts of the lure holding loop highlighted.

Lure holding loop 32 (a.k.a. primary retaining region) extends from lure holding end 30, FIG. 3b. In a preferred embodiment lure holding loop 32 is an elongated loop with a loop bottom 34. Lure holding loop 32 is symmetric relative to axis X. Lure holding loop 32 has loop sides 36 that angle outward from axis X. Loop sides 36 widen from loop bottom 34 and then narrow towards main shaft 26, the widening from loop bottom 34 (loop widening angle $\theta_1$) is at a lesser loop-side angle than the narrowing at main shaft 26 (loop narrowing angle $\theta_2$). The loop widening angle $\theta_1$ is less than said loop narrowing angle $\theta_2$. The wire has an angled bend 23 in both loop sides 36. The symmetry and angling of loop sides 36 acts to keep lure 22 centered relative to axis X, located near loop bottom 34 and provides for optimal performance of the lure when in use in water. Although lure holding loop 32 is shown as an elongated symmetric loop, the lure holding loop could take on different shapes that do not deviate from the scope of the invention. However, with these different lure holding loop shapes the lure may move differently. Lure holding loop 32 has a lure holding loop extension 33 that extends towards the line attachment end 28. Lure holding loop extension 33 includes additional components that create strength, multiple resistance points that prevent the lure from disconnecting and if the lure does pass one or more of the resistance points the lure can still move freely as a natural lure. Each resistance point is a narrowing of space between two parts of said wire where that space is narrower than the wire thickness. Holding loop extension 33 may be a subset of the elements shown within the bracket.

Figures 3C, 3D:
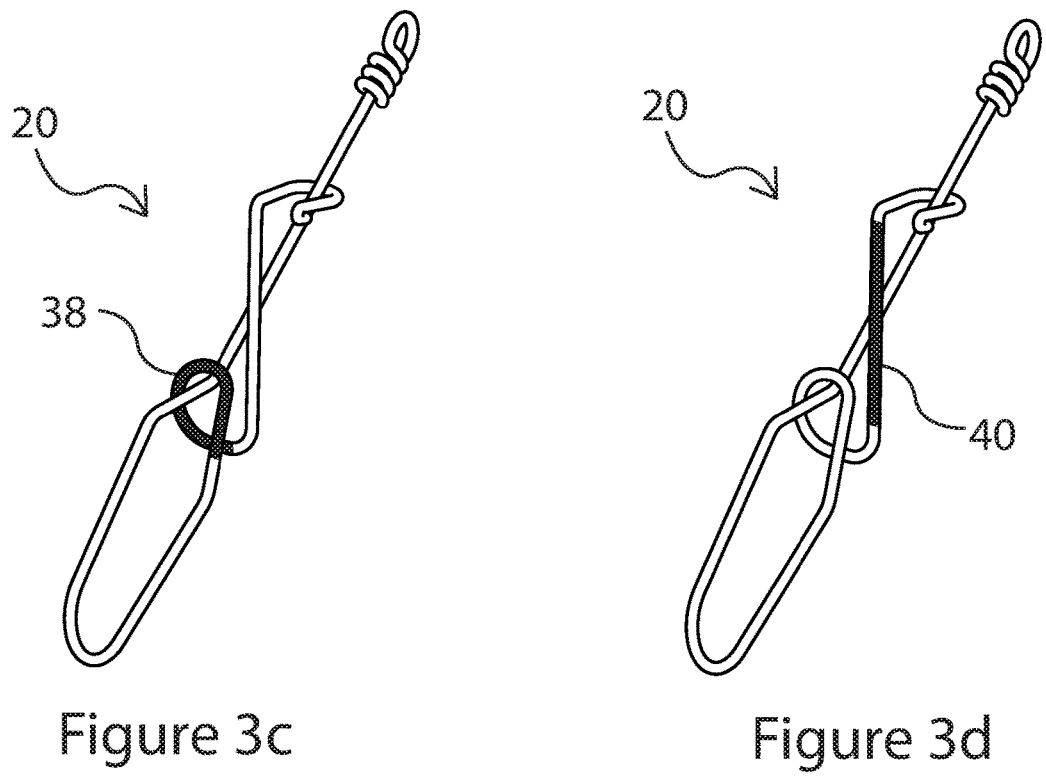
FIG. 3c is a perspective view of the device in FIG. 1 with the retaining loop highlighted.
FIG. 3d is a perspective view of the device in FIG. 1 with the bracing section highlighted.

Extending from holding lure loop 32 is a retaining loop 38 that crosses back onto itself, FIG. 3c. Retaining loop 38 is located near lure holding end 28 of main shaft 26. The function of retaining loop 38 is to keep lure 22 from riding back up main shaft 26 and disconnecting itself from device 20 during casting or when a fish is attached to the lure. Retaining loop 38 performs this function by first creating two resistance points (one used twice), FIG. 3i. Each resistance point provides enough tension so as to limit or preclude lure movement through the resistance point without manual assistance. Each resistance point is separated by open spaces (a.k.a. retaining regions) that allow the lure to move freely. For example, secondary retaining region S, FIG. 3j, is the region bounded by resistance points A and B and includes most of retaining loop 38. Tertiary retaining region T, FIG. 3k, is the region bounded by resistance points C and D and includes portions of main shaft 26, bracing section 40 and lure holding loop 32. Quaternary retaining region Q, FIG. 3l, is the region bounded by resistance points D and E and includes portions of main shaft 26, bracing section 40 and arced section 44. Free movement of the lure improves chances that the lure will perform as intended during each cast. Resistance point A (fourth resistance point) is generated where retaining loop 38 gets close to or touches main shaft 26. Resistance point A provides resistance to the lure moving out of lure holding loop 32. Resistance points B/C (third and fifth resistance points) is generated where retaining loop 38 crosses back onto itself. Resistance point B/C provides resistance twice when attaching a lure and twice when taking a lure off because the lure goes through that point two times. Further enhancing the retaining properties of retaining loop 38 is the orientation of the retaining loop perpendicular to device axis X. This perpendicular orientation requires lure 22 to move around device axis X and not along the length of device 20 and therefore helps to limit the lure from detaching from device 20.

The next part of device 20 is bracing section 40, FIG. 3d. Bracing section 40 (a.k.a. zig segment) extends from retaining loop 38 towards line holding element 42. Bracing section 40 is substantially parallel to main shaft 26 and crosses the main shaft to create resistance point D (second resistance point), FIG. 3i. The section of device 20 between resistance points B/C and D provides a secondary retaining region for the lure, where lure 22 can still move relatively freely with appropriate action to still entice fish with a natural lure action if for some reason the lure moves past resistance points A, B and C during the retrieve.

Figure 3E:
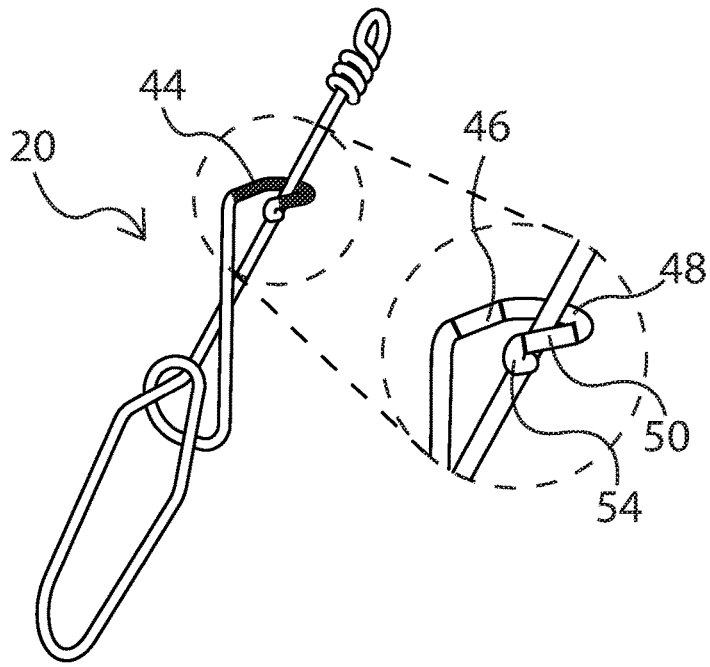
FIG. 3e is a perspective view of the device in FIG. 1 with various parts of the arced section highlighted.
Figure 3F:
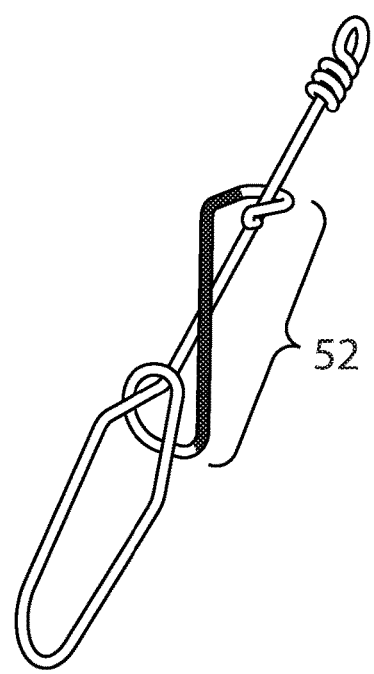
FIG. 3f is a perspective view of the device in FIG. 1 with the zigzag structure highlighted.
Figure 3G:
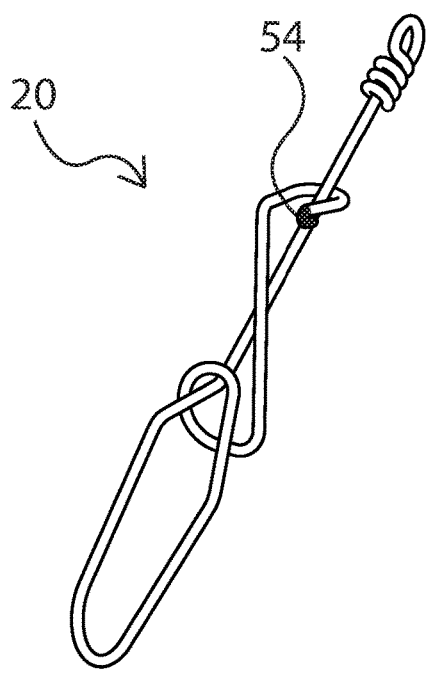
FIG. 3g is a perspective view of the device in FIG. 1 with the folded end highlighted.

Bracing section 40 terminates in arced section 44, FIG. 3e. Arced section 44 includes a zag segment 46, entry bend 48 and terminating segment 50. Zag segment 46 and terminating segment 50 are two parallel arced sides of arced section 44, the zag segment and terminating segment connected by entry bend 48. Together bracing section 40 and zag segment 46 create a zigzag structure 52 across main shaft 26, FIG. 3f. Zigzag structure 52 consists of a straight elongated middle section with two shorter angled end sections. Zigzag structure 52 provides strength, resistance points and additional holding regions for device 20. Arced section 44 crosses main shaft 26 at the same position on opposing sides of main shaft 26 creating resistance point E (first resistance point), FIG. 3i. Arced section 44 bends away from both sides of main shaft 26. The side of arced section 44 with the entry point 21 is longer than the side of the arced section which is on the opposite side of main shaft 26. Resistance point E is the last of five resistance points that help to secure lure 22 to device 20. Arced section 44 preferably terminates with a folded end 54, FIG. 3g. Arced section 44 provides the entry point (via folded end 54) for the lure and is bent away from line attachment end 28 to assist in allowing device 20 to slide more easily through weeds and allowing a lure retrieval device to more easily slide over the snap. Folded end 54 is bent away from the line attachment end 28 to further assist in allowing the device to slide more easily through weeds versus being bent sideway, thus doubling the width of the segment. Folded end 54 also hides the sharp edge from directly facing a user's fingers or clothing. Arced section 44 bends away from the line attachment end 28. Terminating segment 50 is longer than zag segment 46; this structure helps to mechanically limit the unraveling of device 20.

Figure 3H:
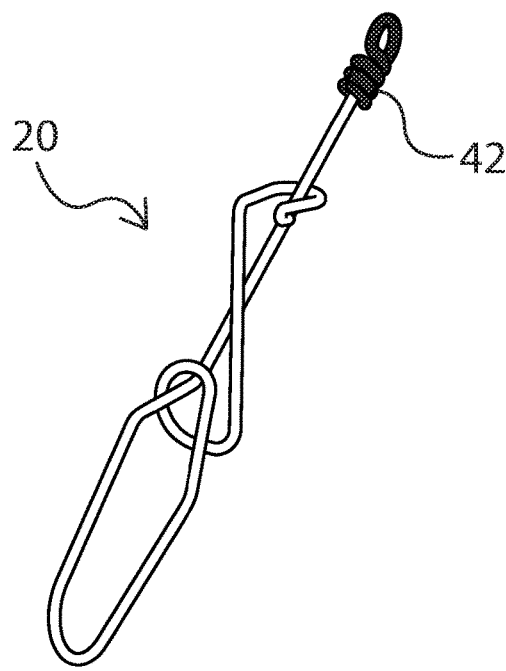
FIG. 3h is a perspective view of the device in FIG. 1 with the line holding element highlighted.
Figure 4:
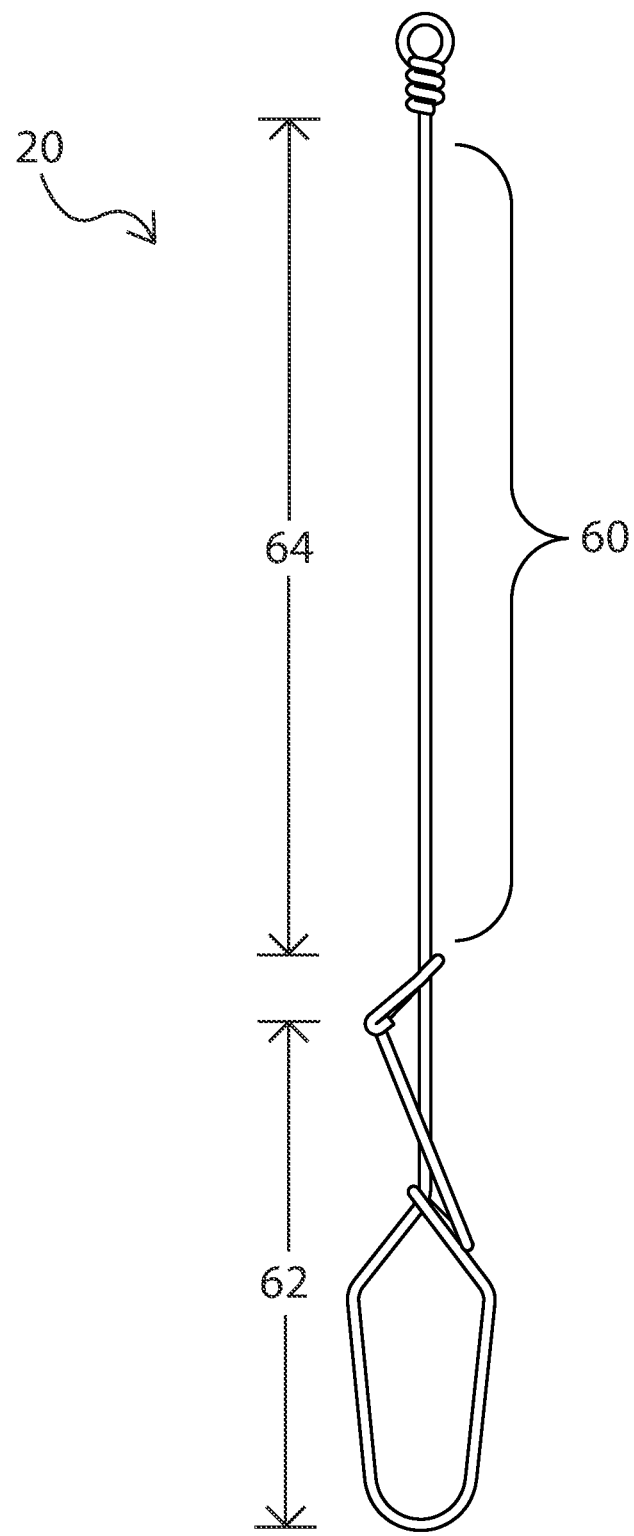
FIG. 4 is a front elevational view of the device in FIG. 1 including a solid metal leader.

Line holding element 42 extends from line attachment end 28, FIG. 3h. In a preferred embodiment line holding element 42 is a closed wire twist. Line holding element 42 could be any line holding element from the group consisting of an eyelet, loop and closed wire twist. Device 20 may be further modified by adding a solid wire leader 60 extending from main shaft 26 to line holding element 42 as shown in FIG. 4. Device 20 has a snap length 62 defined as a length inclusive from loop bottom 34 to said entry point at folded end 54. Solid wire leader 60 is the only piece of wire between the line attachment element and all remaining elements. Solid wire leader 60 has a solid wire leader length 64 greater than snap length 62. A solid wire leader 60 is often preferred when fishing for game fish that are armed with sharp teeth and/or for casting certain types of lures that require a side-to-side action such as "jerkbaits" or "glidebaits". The stiffer leader allows the angler to more easily impart the sharp action needed to work such baits. Such lures can often times end up side-by-side with the leader or line due to the side-to-side action. If a fish with sharp teeth strikes, the fish can often times cut straight through the line.

Device 20 is first used by attaching fishing line 24 to line holding element 42. Fishing line 24 may be attached using any of numerous knots that are well known in the art. Lure attachment element is first slipped over folded end 54 and along arced section 44 where the lure encounters first resistance point E. Once pushed past the first resistance point E, lure 22 continues onward past zag segment 46 and onto bracing section 40 where lure encounters second resistance point D. Once pushed past the second resistance point D, lure 22 continues onward to retaining loop 38 where the lure encounters third resistance point B, C (for the first time) where the retaining loop crosses back onto itself. Once pushed past the third resistance point B, C, lure 22 continues along retaining loop 38 until the lure reaches the fourth resistance point A where retaining loop 38 crosses main shaft 26. Once pushed past the fourth resistance point A, lure 22 continues along retaining loop 38 until the lure encounters the fifth resistance point B, C (for the second time) where retaining loop crosses lure holding loop 32. Once pushed past the fifth resistance point B, C, the lure enters lure holding loop 32.

One should also consider that, over time, the constant opening and closing of snaps with open and closing mechanisms weakens them. This is where the Prevent Snap's additional holding regions are of significant value as they provide for only the gradual distortion of the device's form when adding and removing lures over time.

Device 20 has many benefits over prior art devices. First, there is no opening and closing of the device when putting on and taking off a lure. Other devices that are based on opening and closing weaken over time with no apparent notification that they have weakened. Also, smaller opening and closing styled snaps can be dexterously challenging and larger size snaps can be hard on the user's fingers. The Prevent Snap, having no tight curl at its entry, in most instances, allows the snap to be easily fed through an eyelet without the need of a split ring. To the contrary locking-styled, open-close snaps, having a tight curl at entry that may require a split ring be added in order to accommodate attaching. Second, the use of multiple points of contact (up to five in the current device) is of great benefit. When only a single point of contact is used, if that single point is stressed to failure, there is no back up and lures are more likely to come off. Third, perpendicular retaining loop 38 provides a point of contact which does not allow a lure to work past without great difficulty. Fourth, the bends running parallel to the main shaft that create zig-zag structure 52 ensure that a lure will continue to track correctly whereas perpendicular curls in other prior art devices force a lure sideways. Fifth, device 20 will not unwind or open without significant effort beyond fishing and line strength. Sixth, arced section 44 of device 20 is angled away from line attachment end 28 in an effort to allow weeds and, potentially, lure retrievers to slide more easily over the front of the device. If instead the front of device 20 (arced section 44) were angled towards line attachment end 28, the front would provide a fairly sizeable gap wherein weeds could collect and where a lure retriever could potentially catch. Seventh, the lure holding loop which holds the lure is offset from the main shaft such that when aggressively working a lure, the devices own structure will not repeatedly guide said lure, with force, directly into a point of contact. Eighth, in low light conditions, it is easier to wind a lure on by feel vs. attempting to open and close a different style of snap. Smaller sizes are more accommodating for similar reasons; less dexterously challenging. Ninth, the sharp end point (folded end 54) is tucked away. Tenth, prior art cross-locking snaps which employ a dual open close structure that overlap, while stronger than some embodiments of open and closing snaps, suffer from some of the same problems. The prevent snap is structurally appropriate for a built-in leader version of a snap while the cross-locking designs are not. Eleventh, non-opening and closing snaps, which employ a single half curl and single point of contact, will develop a space in that single point of contact over time which then allows a lure to work its way free. Twelfth, overlapping curls in the form of an open-close snap, due to the singular point of contact; provide a way for a lure to work free. The Prevent Snap, lacking the overlapping curls does not double the thickness of the wire; this double thickness of the wire can be problematic when connecting a lure directly to an eyelet (i.e. no split ring). Thirteenth, the Prevent Snap has multiple points of contact and therefore does not allow a lure to easily work its way free. By contrast, snaps with multiple curls but no points of contact allow a lure to start working its way back out where the lure usually gets stuck, ruining the intended action of the lure. Smaller versions of the Prevent Snap can accommodate eyelets and split rings of moderate size, or larger, while multiple curl snaps are also usually all but destroyed when winding on a lure with a moderate sized eyelet or split ring. Fourteenth, the Prevent Snap has points of contact which are not on the same parallel as the main shaft making it more difficult for a lure to work free while other multiple curling snaps that do have points of contact that are on the same parallel as the main shaft, are not as effective. Fifteenth, the Prevent Snap, having greater space in between the curls, the main shaft and points of contact, also allow greater mobility between the curls which aids in allowing the lure to continue to work as expected.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. A device for connecting a lure, comprising:
   a) a main shaft comprising a line attachment end and a lure holding end;
   b) a line holding element at said line attachment end;
   c) a lure holding loop at said lure holding end;
   d) a retaining loop continuing from said lure holding loop; and
   e) wherein said retaining loop curls to cross upon said lure holding loop to form a crossing point with a secondary retaining region and a tertiary retaining region on either side of said crossing point; wherein said secondary retaining region and tertiary retaining region are open spaces; whereby when the lure is within these retaining regions the lure can move freely with a natural lure action.

2. The device as recited in claim 1, further comprising a bracing section extending from said retaining loop towards said line holding element, wherein said bracing section crosses at an acute angle to form a point of resistance with said main shaft.

3. The device as recited in claim 2, further comprising an arced section extending from said bracing section, wherein said arced section crosses said main shaft, wherein said arced section curves with two parallel arced sides away from said line attachment end.

4. The device as recited in claim 3, wherein said arced section comprises a curved region connecting a terminating segment and a zag segment, wherein said terminating segment is longer than said zag segment.

5. The device as recited in claim 3, wherein a first resistance point is created between said arced section and said main shaft.

6. The device as recited in claim 2, further comprising a zag segment, wherein said bracing section and said zag segment create a zigzag structure across said main shaft.

7. The device as recited in claim 6, wherein said arced section terminates with a folded end that is parallel with said zag segment.

8. The device as recited in claim 2, wherein a second resistance point is created between said bracing section and said main shaft.

9. The device as recited in claim 2, wherein a fourth resistance point is created between said retaining loop and said main shaft.

10. The device as recited in claim 1, wherein said line holding element is a closed wire twist.

11. The device as recited in claim 1, further comprising an entry point and a solid wire leader extending from said main shaft to said line holding element, wherein said holding loop comprises a loop bottom, wherein the device comprises a snap length defined as a length inclusive from said loop bottom to said entry point, wherein said solid wire leader comprises a solid wire leader length greater than said snap length.

12. The device as recited in claim 1, wherein said lure holding loop is a symmetric elongated loop with a pair of loop sides that angle outward symmetrically from the main shaft.

13. The device as recited in claim 12, wherein said symmetric elongated loop comprises a loop bottom; wherein said pair of loop sides widen with a loop widening angle from said loop bottom and then narrow with a loop narrowing angle towards said main shaft, wherein said loop widening angle is less than said loop narrowing angle.

14. The device as recited in claim 1, wherein a third resistance point and a fifth resistance point are created between said retaining loop and said lure holding loop.

15. A device for connecting a lure, comprising:
   a) a single piece of wire comprising a wire thickness, said wire shaped to comprise a main shaft comprising a line attachment end and a lure holding end;
   b) a line holding element at said line attachment end;
   c) a lure holding loop at said lure holding end;
   d) a lure holding loop extension;
   e) an entry point between said line attachment end and said lure holding end; and
   f) wherein said lure holding loop extension extends towards said line attachment; end creating a plurality of resistance points and retaining regions for the lure, wherein each resistance point is a narrowing of space between two parts of said wire where that space is narrower than said wire thickness, wherein each resistance point is separated by a retaining region that is larger than said wire thickness that allows the lure to move freely with a natural lure action, wherein the first resistance point that is closest said entry point is created by an arced section that crosses said main shaft at the same position on opposing sides of the main shaft in relation to the first resistance point to create a retaining region.

16. The device as recited in claim 15, further comprising a tertiary retaining region between said lure holding loop and said line holding end, wherein said tertiary retaining region is open space bounded by two resistance points.

17. The device as recited in claim 15, further comprising a quaternary retaining region between said lure holding loop and said line holding end, wherein said quaternary retaining region is open space bounded by two resistance points.

18. The device as recited in claim 15, wherein each of said two or more resistance points limits lure movement through said resistance point.

19. The device as recited in claim 15, wherein one of said plurality of resistance points is a double resistance point where the lure must pass through this resistance point twice to be attached or removed from the lure holding loop.

20. The device as recited in claim 15, wherein the line holding element comprises a closed wire twist.

21. The device as recited in claim 15, wherein the line holding element comprises an eyelet.

22. The device as recited in claim 15, wherein the line holding element comprises a loop.

23. A device for connecting a lure, comprising:
a) a main shaft comprising a line attachment end and a lure holding end;
b) a line holding element at said line attachment end;
c) a lure holding loop at said lure holding end; and
d) wherein said lure holding loop comprises a holding loop extension that extends towards said line attachment end in the form of a zigzag structure consisting of a straight elongated middle section that creates a resistance point with said main shaft and two shorter angled end sections.

24. A device for connecting a lure, comprising:
a) a main shaft comprising a line attachment end and a lure holding end;
b) a line holding element at said line attachment end;
c) a lure holding loop at said lure holding end;
d) an entry point;
e) an arced section extending from said entry point; and
f) wherein said arced section crosses said main shaft to create a resistance point; wherein said arced section bends away from said line attachment end towards said lure holding end on both sides of said main shaft.

25. A device for connecting a lure, comprising:
a) a main shaft comprising a line attachment end and a lure holding end;
b) a line holding element at said line attachment end;
c) a lure holding loop at said lure holding end, said lure holding loop comprising a loop bottom and a holding loop extension, said holding loop extension consisting of a straight elongated middle section that creates a resistance point with said main shaft;
d) an entry point between said line attachment end and said lure holding end; and
e) a solid wire leader extending as an extension of the main shaft from the entry point to the line holding element; and
f) wherein said solid wire leader is the only piece of wire between said line attachment element and all remaining elements, wherein said solid wire leader has a length greater than the distance from the loop bottom to the entry point.

26. A device for connecting a lure, comprising:
a) a main shaft formed of metal wire comprising a line attachment end and a lure holding end, the main shaft defining a central axis for the device;
b) a line holding element at said line attachment end;
c) a lure holding loop at said lure holding end, said lure holding loop comprises a symmetric elongated loop formed from the metal wire with loop sides that angle outward symmetrically from the central axis of said main shaft; and
d) wherein said main shaft, said line holding element and said symmetric lure holding element are formed from the same single piece of wire, wherein the wire has an angled bend in both of said loop sides.

27. A device for connecting a lure, comprising:
a) a main shaft comprising a line attachment end and a lure holding end;
b) a line holding element at said line attachment end;
c) a lure holding loop at said lure holding end,
d) an entry point;
e) an arced section extending from said entry point, said arced section crossing said main shaft to create a resistance point, said arced section bends away from both sides of said main shaft; and
f) wherein the side of the arced section with the entry point is longer than the side of the arced section which is on the opposite side of said main shaft.

* * * * *